(12) United States Patent
Chung et al.

(10) Patent No.: US 7,548,393 B2
(45) Date of Patent: Jun. 16, 2009

(54) HDD TRACK FOLLOWING CONTROL APPARATUS AND METHOD

(75) Inventors: Da-woon Chung, Suwon-si (KR); Jung-ho Lee, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 11/766,941

(22) Filed: Jun. 22, 2007

(65) Prior Publication Data
US 2008/0002285 A1   Jan. 3, 2008

(30) Foreign Application Priority Data
Jun. 29, 2006   (KR) .................. 10-2006-0059244

(51) Int. Cl.
*G11B 5/596* (2006.01)
(52) U.S. Cl. ............... 360/77.02; 360/77.07; 360/78.09
(58) Field of Classification Search .............. None
See application file for complete search history.

(56) References Cited

U.S. PATENT DOCUMENTS 5,369,345 A * 11/1994 Phan et al. .......... 318/561
6,118,616 A * 9/2000 Jeong ................ 360/78.07
2003/0128458 A1* 7/2003 Ge et al. ............ 360/78.06
2003/0184909 A1* 10/2003 Zhang et al. ........ 360/77.04

FOREIGN PATENT DOCUMENTS

| JP | 06-325510 | 11/1994 |
| JP | 07-226041 | 8/1995 |
| JP | 11-149606 | 6/1999 |

* cited by examiner

*Primary Examiner*—Jason C Olson
(74) *Attorney, Agent, or Firm*—Volentine & Whitt, P.L.L.C.

(57) ABSTRACT

A track following control apparatus and method for a hard disk drive (HDD) is disclosed and includes an estimator receiving a position error signal from a HDA and generating estimated state information for a magnetic head in response to the position error signal, and a controller receiving the estimated state information and generating a control signal controlling operation of the HAD, wherein the estimator and controller are variably configured according to a write mode or a read mode.

20 Claims, 5 Drawing Sheets

Estimator

HDD TRACK FOLLOWING CONTROL APPARATUS AND METHOD

BACKGROUND OF THE INVENTION

1. Field of the Invention

The present invention relates to a track following control method and apparatus for a hard disk drive (HDD). More particularly, the invention relates to a track following control method in which estimators and controllers according to operation modes of an HDD separately exist and an apparatus suitable for performing the track following control method.

This application claims the benefit of Korean Patent Application No. 10-2006-0059244, filed on Jun. 29, 2006, in the Korean Intellectual Property Office, the disclosure of which is incorporated herein in its entirety by reference.

2. Description of the Related Art

Information is stored on a hard disk drive (HDD) within a concentric arrangement of data storage tracks. The magnetic read/write head (hereafter "head") of the HDD must be aligned over a specified target track in order to perform read/write operations. Thus, read/write operations require a certain degree of accuracy in the positioning of the head throughout read/write operations. A track following control apparatus is commonly used within the HDD to maintain proper head positioning.

Figure (FIG.) 1 is a general block diagram of a conventional track following control apparatus. The illustrated track following control apparatus includes an estimator 102 which estimates a position, velocity, and/or acceleration for the head based on a position error signal derived from a servo signal recorded at defined intervals on the disk. (The position velocity and/or acceleration are singularly or collectively referred to hereafter as "state information". The track following control apparatus also includes a controller 104 generating a control signal that drives the head in accordance with the estimated state information obtained from estimator 102. The control signal provided by controller 104 is applied to a head disk assembly (HDA) 106 which mechanically positions the head.

FIG. 2 is a conceptual block diagram illustrating a mathematical model that describes the operation of the conventional track following control apparatus illustrated in FIG. 1.

Referring collectively to FIGS. 1 and 2, estimator 102 is assumed to output estimation values x1h, x2h, and x3h respectively indicating the estimated state information (e.g., position, velocity, and acceleration) for the head. The estimation values x1h, x2h, and x3h may be obtained using the following well known equations:

$x1h = x1b + L1*\text{estimate}$, $x2h = x2b + L2*\text{estimate}$, $x3h = x3b + L3*\text{estimate}$.

Controller 104 may be implemented using amplifiers that respectively multiply the estimation values x1h and x2h by gain factors K1 and K2. Following gain factor multiplication, estimation values x1h and x2h are applied to a first adder. Estimation value x3h is applied to second adder with a unity gain factor along with the output of the first adder. The output of the second adder is applied to HAD 106 as the control signal.

However, this straight forward approach to implementing a track following control apparatus may be complicated by certain emerging HDD designs. For example, the greatly increased recording density of contemporary disks with HDDs often motivates the use of separate read and write heads. Within this configuration, write heads are commonly wider than read heads in order to provide improved write operation performance. This physical size difference between read and write heads necessitates the use of a different (e.g., more strict) positioning tolerance for the write head. In addition, read operation failures are typically considered less critical than write operation failures, because it is relatively easy to "retry" a failed read operation. In contrast, a significant positioning error for a write head during a write operation may result in an overwrite of data stored in adjacent track. Thus, a relatively strict positioning tolerance for a write head during a write operation is mandated.

As a result of the foregoing considerations, the tracking control implemented by an HDD controller is typically designed in relation to the write operation. The resulting tracking tolerance is also applied by the HDD controller to read operations.

Unfortunately, as track densities have continued to increase, the characteristics (e.g., the detected amplitude) of the position error signal has become a limiting factor in the design and implementation of track following control apparatuses within emerging HDDs. That is, increased track densities result in narrower track widths. Narrower track widths yield a narrower recording width for the servo signal from which the position error signal is derived. That is, a narrower recording width for the servo signal results in a position error signal having reduced (and therefore less easily detected) amplitude. As a result, the operating margin for the constituent track following control apparatus decreases with the decrease in the amplitude of the position error signal. This reduced operating margin affords less protection from disturbances within operation of the HDD.

However, since the tolerance for positioning errors during read operations is greater than that for write operations, read operations are generally less susceptible to the system design limitations cause by the reduced amplitude of the position error signal. However, conventional track following control apparatuses are designed with the same operating characteristics for both read and write operations. So, read operation tend to suffer under the same positioning error tolerances imposed by write operations.

SUMMARY OF THE INVENTION

Embodiments of the invention provide a track following control method and apparatus having different operating characteristics for read and write operations with a hard disk drive (HOD).

In one embodiment, the invention provides a method implementing track following control in a hard disk drive (HDD) operating in a write mode or a read mode, the HDD comprising; an estimator providing estimated state information for a head, and a controller controlling operation of a head disk assembly (HDA) moving the head in response to the estimated state information and generating a corresponding position error signal, the method comprising; selectively configuring the estimator and controller in accordance with the write mode or the read mode, and performing track following control using the selectively configured estimator and controller.

In the related aspect, the method may further comprise; receiving a write command in the HDD indicating the write mode and in response to the write command selecting a write mode estimator and a write mode controller for operation. By operation of the write mode estimator at least one gain constant is applied to a signal derived from the position error signal received from the HDA to generate the estimated state information. By operation of the write mode controller, at least one gain constant is applied to the estimated state information to generate a control signal controlling movement of the head by the HDA during the write mode.

In another related aspect, the method may further comprise; receiving a read command in the HDD indicating the read mode, and in response to the read command selecting a read mode estimator and a read mode controller for operation. By operation of the read mode estimator, at least one gain constant is applied to a signal derived from the position error signal received from the HDA to generate the estimated state information. By operation of the read mode controller, at least one gain constant is applied to the estimated state information to generate a control signal controlling movement of the head by the HAD during the read mode.

In another aspect, the invention provides a track following control apparatus for a hard disk drive (HDD) comprising a head disk assembly (HDA) moving a magnetic head over a disk, the track following control apparatus comprising; an estimator receiving a position error signal from the HDA and generating estimated state information for the magnetic head in response to the position error signal, and a controller receiving the estimated state information and generating a control signal controlling operation of the HAD, wherein the estimator and controller are variably configured in a write mode and a read mode.

In one related aspect, the estimator may comprise; a write mode estimator applying a first estimator gain constant to the position error signal to generate first estimated state information, and a read mode estimator applying a second estimator gain constant to the position error signal to generate second estimated state information, wherein the first and second estimator gain constants are different.

In another related aspect, the controller comprises; a write mode controller applying a first controller gain constant to the first estimated state information to generate a control signal controlling operation of the HAD, and a read mode controller applying a second controller gain constant to the second estimated state information to generate a control signal controlling operation of the HAD, wherein the first and second controller gain constants are different.

BRIEF DESCRIPTION OF THE DRAWINGS

Embodiments of the present invention will be described with reference to the attached drawings in which.

DESCRIPTION OF EMBODIMENTS

A track following control method and apparatus according to an embodiment of the present invention independently operate constituent estimator(s) and/or controller(s) in accordance with read and write operations. Thus, different track following operations may be selectively applied within a hard disk drive (HDD) using variably controlled (e.g., configured) estimator(s) and/or controller(s), where such variable control (configuration) is performed in relation to a read mode of operation and a write mode of operation.

In one embodiment of the invention, the estimator(s) and/or controller(s) within the HDD may be conventionally configured and operated during write operations. That is, a write head may be conventionally controlled in its track positioning during write operations in view of a defined positioning tolerance. This defined positioning tolerance will take into account, as needed, the expected amplitude of a position error signal (PES) provided by the disk of the HDD.

However, estimator(s) and/or controller(s) within the HDD may be differently configured in embodiments of the invention during read operations. That is, despite the strict positioning tolerance applied to the write head during write operations, the read head may be positioned with a reduced tolerance, thereby allowing faster read operations and reducing constraints on the read operation of the HDD. As a result, read operations will enjoy reduced susceptibility to operating disturbances even though the amplitude of the constituent PES is reduced.

In the description that follows, it is assumed that the amplitude margin provided by a PES is relatively small during write operations and relatively large during read operations. Nonetheless, a track following control method and apparatus according to an embodiment of the invention may independently optimize track following operations during both read and write operations by selectively configuring an estimator and controller suitable for the operation being performed.

Figure 3:
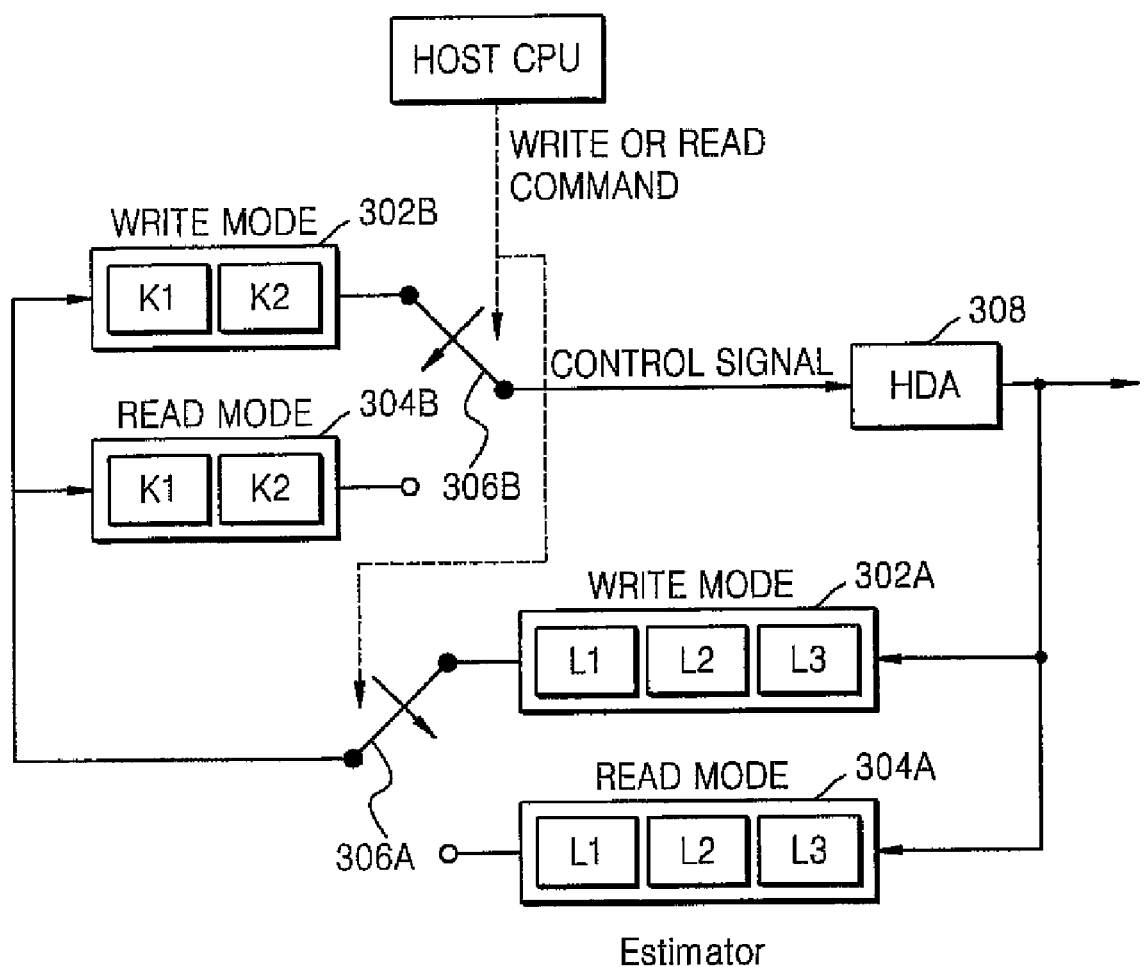
FIG. 3 is a block diagram of a track following control apparatus for a hard disk drive (HDD) according to an embodiment of the present invention.

FIG. 3 is a block diagram of a track following control apparatus for an HDD according to an embodiment of the present invention. Within this illustrated embodiment, a write estimator is provided with three (3) gain constants L1, L2, and L3 suitable for write operations, and a read estimator is provided with three (3) gain constants L1, L2, and L3 suitable for read operations. Further, a write controller is provided with two (2) gain constants K1 and K2 suitable for write operations, and a read controller is provided with two (2) gain constants K1 and K2 suitable for read operations.

Referring to FIG. 3, the track following control apparatus comprises a write mode track following controller 302, a read mode track following controller 304, and a selector 306. Write mode track following controller 302 and read mode track following controller 304 are designed to be selectively configured for operation during a write mode operation and a read mode of operation within the HDD, respectively.

Write mode track following controller 302 includes a write mode estimator 302A and a write mode controller 302B, read mode track following controller 304 includes a read mode estimator 304A and a read mode controller 304B, and selector 306 includes a first selector 306A and a second selector 306B.

First selector 306A selects either write mode estimator 302A or read mode estimator 304A according to the operating mode (read/write) of the HDD. Second selector 306B selects either write mode controller 302B or read mode controller 304B according to the operating mode of the HDD.

Figure 1:
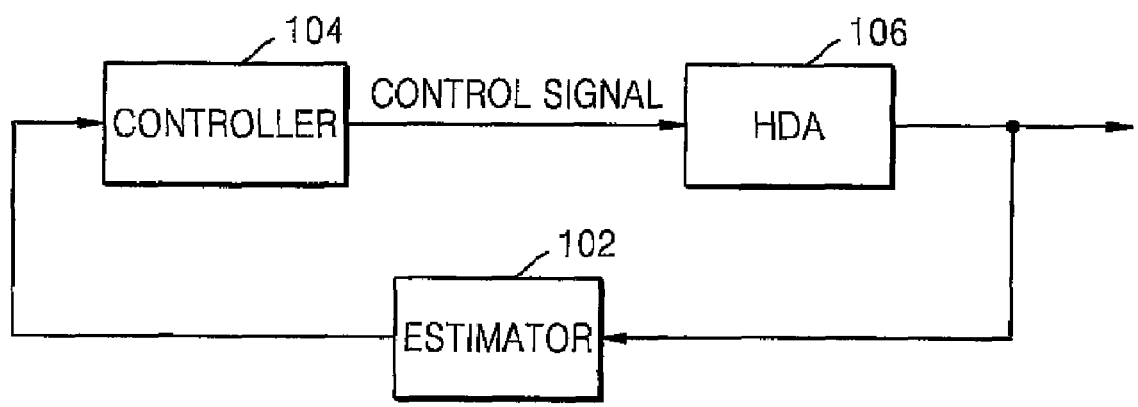
FIG. 1 is a block diagram of a conventional track following control apparatus.
Figure 2:
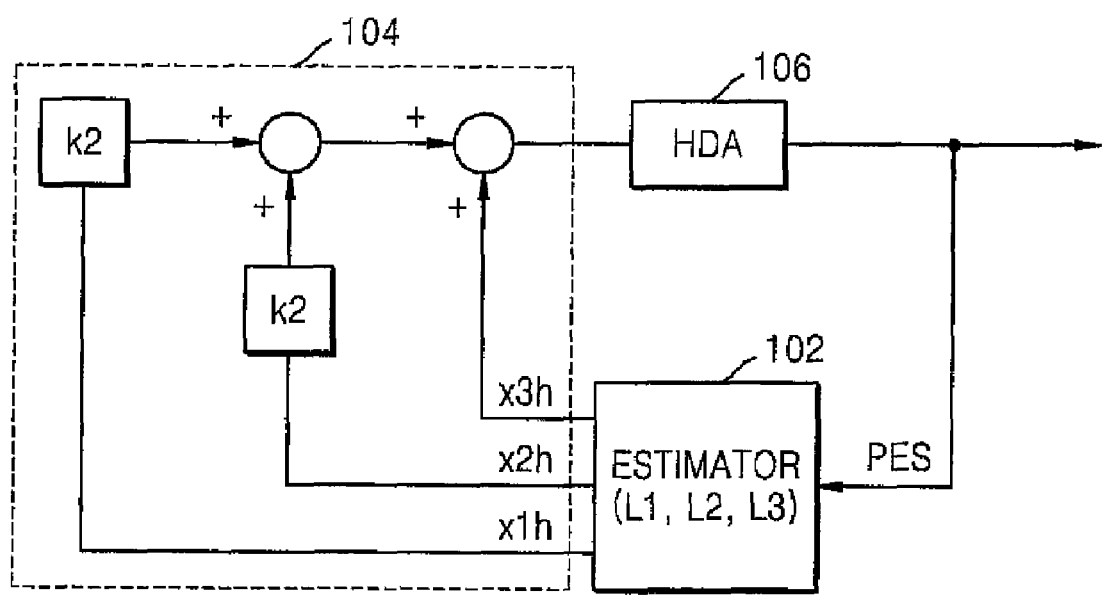
FIG. 2 is a block diagram illustrating a mathematical model of the conventional track following control apparatus illustrated in FIG. 1.

Referring now to FIGS. 2 and 3, write mode estimator 302A provides gain constants L1, L2, and L3 suitable for write operations within the HDD, and read mode estimator 304A provides gain constants L1, L2, and L3 suitable for read operations with the HDD. (In this illustrative context, the terms L1, L2, and L3 are used to denote different gain constants within each mode of operation. Thus, L1 in write mode may not be the same value as I1 in the read mode).

Similarly, write mode controller 302B provides gain constants K1 and K2 suitable for write operations in the HDD, and read mode controller 304B provides gain constants K1 and K2 suitable for read operations in the HDD.

Figure 4:
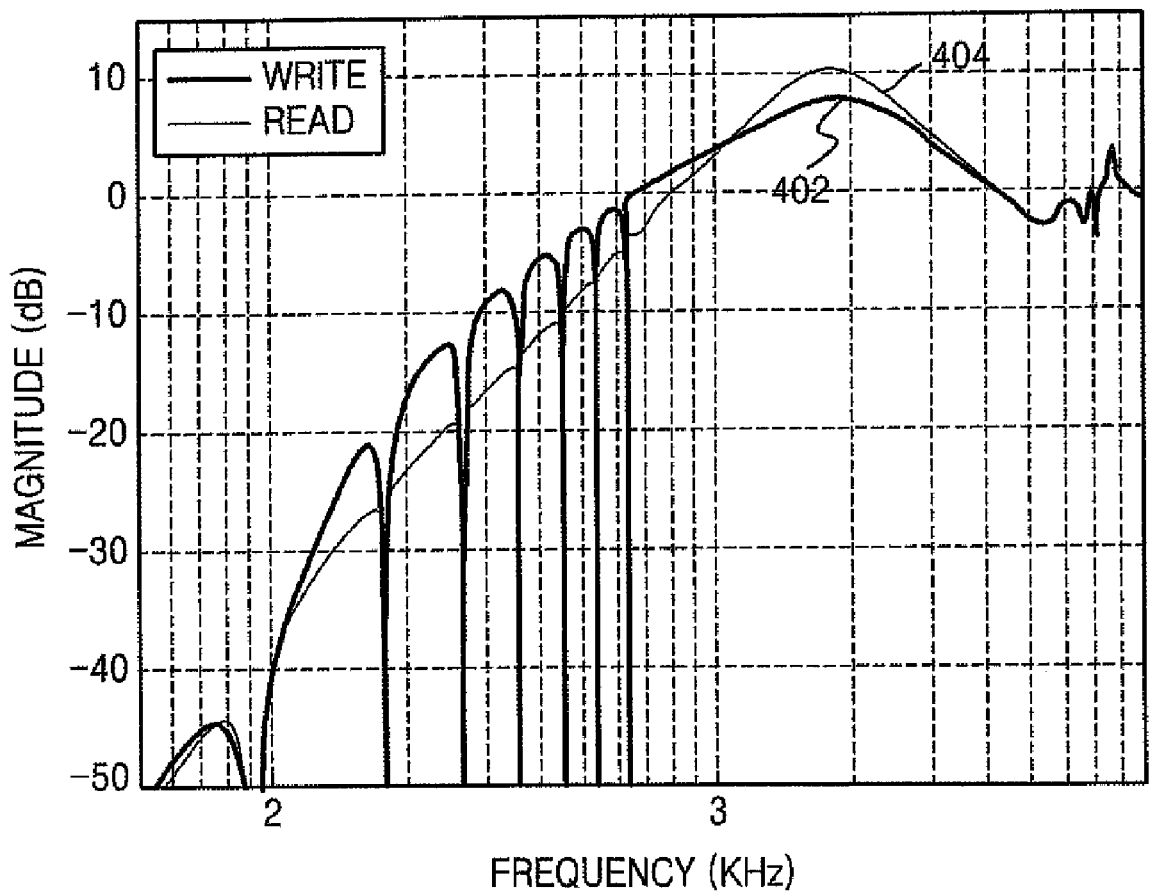
FIG. 4 is a graph illustrating gain/frequency characteristics of the track following control apparatus illustrated in FIG. 3.

FIG. 4 is a graph illustrating gain/frequency characteristics for an exemplary track following control apparatus, such as the one illustrated in FIG. 3. In FIG. 4, reference numeral 402 denotes a gain/frequency characteristic for write mode track following controller 302, and reference numeral 404 denotes a gain/frequency characteristic for read mode track following controller 304.

Referring to FIG. 4, in a frequency region greater than or equal to a defined crossover frequency, the gain of write mode track following controller 302 is smaller than the gain of read mode track following controller 304 However, in a frequency region less than the crossover frequency, the gain of write mode track following controller 302 is larger than the gain of read mode track following controller 304.

Considering the fact that most disturbances occur at a frequency less than 1 KHz and assuming that the crossover frequency is defined as 1 KHz, when a disturbance occurs, write mode track following controller 302 is less susceptible to the typical disturbance than read mode track following controller 304.

However, as described above, since the amplitude margin of the PES is relatively large in the read mode, even if the effect of the disturbance in read mode is larger than that in the write mode, the track following control apparatus illustrated in FIG. 3 can sufficiently deal with the effect of the disturbance.

In FIG. 4, the gain/frequency characteristic curves 402 and 404 have a comb pattern in the frequency region less than the crossover frequency in order to deal with repetitive disturbance. Since a repetitive disturbance typically appears as a series of harmonics, the gain/frequency characteristic of the track following control apparatus for dealing with the repetitive disturbance is designed to deal with a series of harmonics. That is, in the comb pattern gain/frequency characteristics of curves 402 and 404, each comb tooth portion is designed to correspond with a harmonic component of the repetitive disturbance.

Although write mode track following controller 302 and read mode track following controller 304 are illustrated in the embodiment of FIG. 3 as having separate physical implementations, a single physical controller, or even a software routine running on a general (or system) controller may be used to implement these elements. Thus, write mode track following controller 302 and read mode track following controller 304 according to an embodiment of the invention may be implemented using various programs having different operational parameters, (i.e., gain constants). These parameters may be stored in memory associated with the HDD and selectively used according to the operational mode of the HDD.

Figure 5:
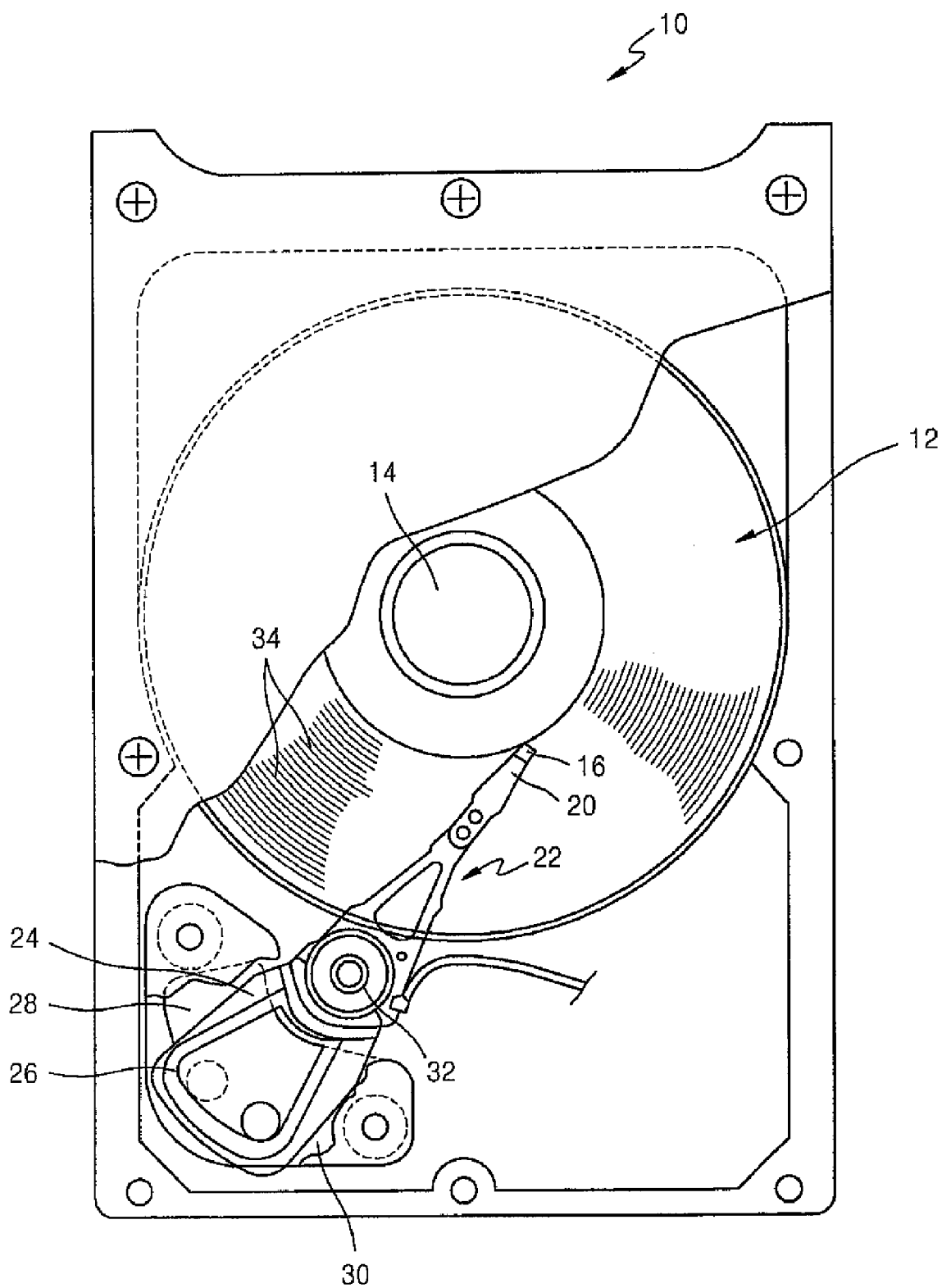
FIG. 5 is a schematic plan view of a head disk assembly (HDA) of an HDD to which the present invention is applied.

FIG. 5 is a schematic plan view showing a head disk assembly (HDA) 10 of an HDD to which the present invention may be applied.

Referring to FIG. 5, HDA 10 includes at least one disk 12 rotated by a spindle motor 14. HDA 10 also includes a magnetic head 16 floating above the surface of disk 12.

Head 16 is adapted to read data from or write data to rotating disk 12 by sensing a magnetic field from the surface of disk 12 or magnetizing the surface of disk 12, respectively. Typically, head 16 is mounted to face the surface of the disk 12. Though a single head 16 is illustrated, it may include a write head for magnetizing disk 12 and a separate read head sensing the magnetic field from disk 12. The read head may be implemented using a magneto-resistive (MR) component.

Head 16 is mounted on a slider 20. Slider 20 generates an air bearing between head 16 and the surface of disk 12. Slider 20 is connected to a head stack assembly (HSA) 22. HSA 22 is attached to an actuator arm 24 associated with a voice coil 26. Voice coil 26 is located adjacent to a magnetic assembly 28 to implement a voice coil motor (VCM) 30. Electrical current supplied to voice coil 26 generates torque which rotates actuator arm 24 around a bearing assembly 32. The rotation of actuator arm 24 moves head 16 across the surface of disk 12 containing concentric tracks 34. Defined sectors along each track 34 store servo information and data.

Figure 6:
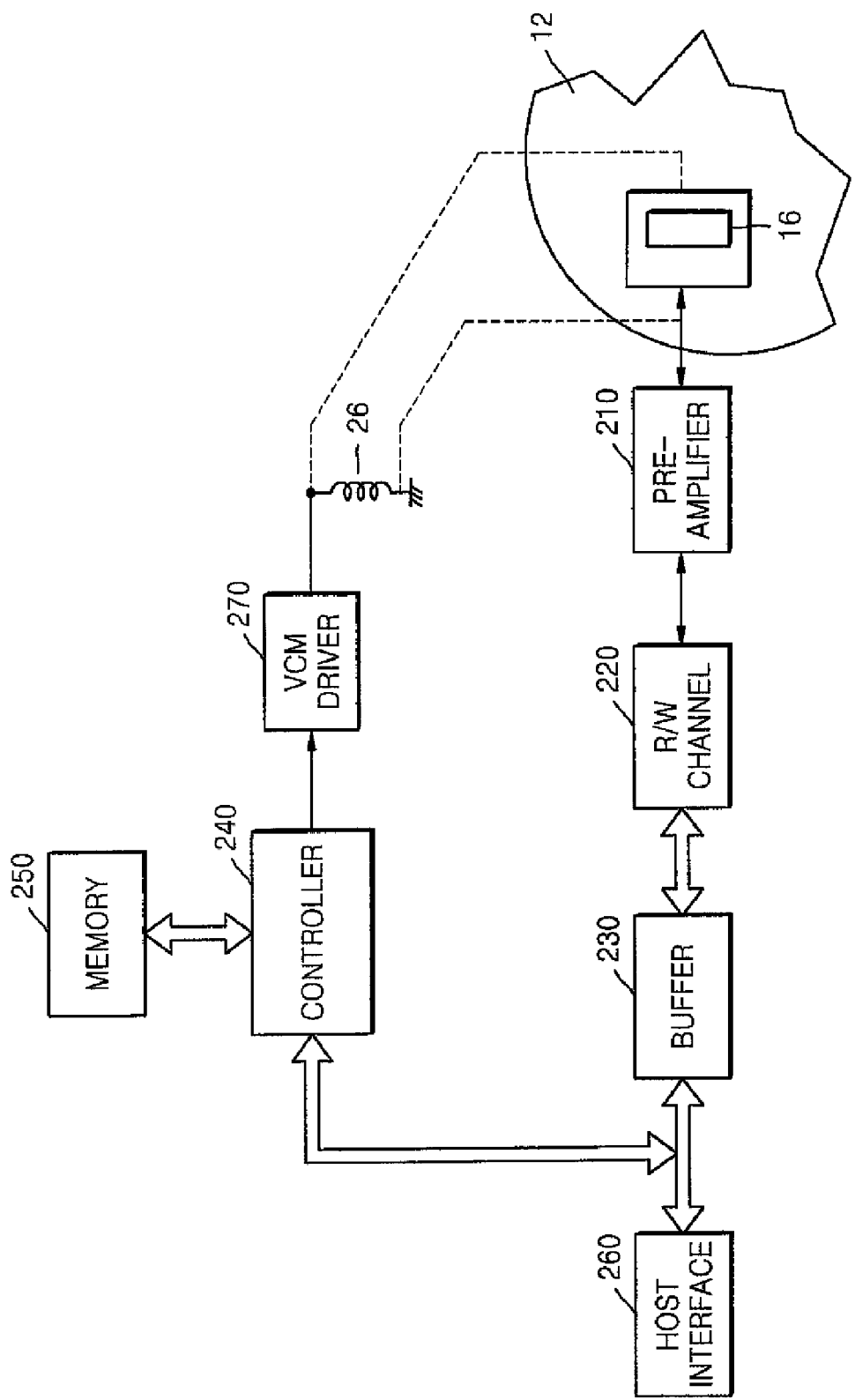
FIG. 6 is a block diagram of a control system for an HDD to which the present invention is applied.

FIG. 6 is a block diagram of a control system for an HDD to which the present invention may be applied. Referring to FIG. 6, the HDD includes disk 12, head 16, a pre-amplifier 210, a read/write (R/W) channel 220, a buffer 230, a controller 240, a memory 250, and a host interface 260.

Pre-amplifier 210 and R/W channel 220 may be implemented in a single circuit referred to as RAN circuit.

Memory 250 stores software programs for controlling the HDD. Memory 250 may be implemented using flash memory or some other nonvolatile memory. Memory 250 may be used to store programs implementing the track following control apparatus illustrated in FIG. 3.

During a read mode, the HDD amplifies an electrical signal sensed from disk 12 by head 16 in pre-amplifier 210 so as to be easily used for signal processing. R/W channel 220 encodes the amplified analog signal in the form of a digital signal, which can be read by a host device (not shown), converts the digital signal into stream data, temporarily stores the stream data in buffer 230, and transmits the stored stream data to the host device via host interface 260.

During a write mode, the HDD receives data from the host device via host interface 260, temporarily stores the received data in buffer 230, sequentially outputs the data stored in buffer 230, converts the output data into a binary data stream suitable for a write channel using RAN channel 220, and records the binary data stream on disk 12 through head 16 using a write current amplified by pre-amplifier 210.

Controller 240 analyzes a command received from the host device through host interface 260 and performs control corresponding to the analysis result. If a write command is input from the host device, controller 240 writes data in data sectors existing between servo sectors while following a track by referring to servo information recorded in the servo sectors.

The present invention can be implemented as a method, an apparatus, and a system. When the present invention is implemented in software, its various component elements are code segments that execute necessary operations. Programs or code segments can be stored in processor readable media and can be transmitted via a computer data signal that is combined with a carrier wave in a transmission medium or in a communication network. The processor readable medium can be any medium that can store or transmit data. Examples of the processor readable medium include electronic circuits, semiconductor memory devices, ROMs, flash memories, erasable ROMs (EROMs), floppy disks, optical disks, hard disks, optical fibers, radio frequency (RF) networks, etc. The computer data signal can be any signal that can be transmitted via transmission media, such as electronic network channels, optical fibers, air, an electronic fields RF networks, etc.

As described above, according to the present invention, a track following control method can optimize a track following operation in each mode by respectively using estimators and controllers suitable for a write mode and a read mode.

A track following control apparatus can improve track following performance against disturbances by selectively using proper operational parameters according to an operation mode of an HDD.

While the present invention has been particularly shown and described with reference to exemplary embodiments thereof, it will be understood by those of ordinary skill in the art that various changes in form and detail may be made therein without departing from the scope of the present invention as defined by the following claims.

What is claimed is:

1. A method implementing track following control in a hard disk drive (HDD) operating in a write mode or a read mode, the HDD comprising an estimator providing estimated state information for a head, and a controller controlling operation of a head disk assembly (HDA) moving the head in response to the estimated state information and generating a corresponding position error signal, the method comprising:
   configuring the estimator and controller differently based on whether the HDD is operating in the write mode or the read mode; and
   performing track following control using the differently configured estimator and controller.

2. The method of claim 1, wherein the state information comprises at least one of an estimated value for position, velocity, and acceleration of the head.

3. The method of claim 1, further comprising:
   receiving a write command from a host device;
   selecting a write mode estimator and a write mode controller for operation;
   by operation of the write mode estimator, applying at least one gain constant to a signal derived from the position error signal received from the HDA to generate the estimated state information; and
   by operation of the write mode controller, applying at least one gain constant to the estimated state information to generate a control signal controlling movement of the head by the HDA during the write mode.

4. The method of claim 3, wherein the at least one gain constant applied by the write mode estimator is selected from a plurality of gain constants.

5. The method of claim 3, wherein the at least one gain constant applied by the write mode controller is selected from a plurality of gain constants.

6. The method of claim 1, further comprising:
   receiving a read command from a host device;
   selecting a read mode estimator and a read mode controller for operation;
   by operation of the read mode estimator, applying at least one gain constant to a signal derived from the position error signal received from the HDA to generate the estimated state information; and
   by operation of the read mode controller, applying at least one gain constant to the estimated state information to generate a control signal controlling movement of the head by the HDA during the read mode.

7. The method of claim 6, wherein the at least one gain constant applied by the read mode estimator is selected from a plurality of gain constants.

8. The method of claim 6, wherein the at least one gain constant applied by the read mode controller is selected from a plurality of gain constants.

9. A method implementing track following control in a hard disk drive (HDD) comprising a head disk assembly (HDA) moving a magnetic head over a disk, the method comprising:
   receiving either a write command or a read command in the HDD; and
   when the write command is received,
      selecting a write mode estimator and a write mode controller for operation;
      by operation of the write mode estimator, applying at least one gain constant to a signal derived from a position error signal received from the HDA to generate estimated state information; and
      by operation of the write mode controller, applying at least one gain constant to the estimated state information to generate a control signal controlling movement of the head by the HDA during a write mode of operation for the HDD; and
   when the read command is received,
      selecting a read mode estimator and a read mode controller for operation;
      by operation of the read mode estimator, applying at least one gain constant to a signal derived from a position error signal received from the HDA to generate the estimated state information; and
      by operation of the read mode controller, applying at least one gain constant to the estimated state information to generate a control signal controlling movement of the head by the HDA during a read mode of operation for the HDD.

10. The method of claim 9, wherein the at least one gain constant applied by the write mode estimator is selected from a first plurality of gain constants, and the at least one gain constant applied by the write mode controller is selected from a second plurality of gain constants.

11. The method of claim 10, wherein the first and second pluralities of gain constants include respectively different gain constants.

12. The method of claim 9, wherein a gain and frequency characteristic defined by operation of the write mode estimator and the write mode controller is characterized by a relatively smaller gain in a frequency region greater than or equal to a crossover frequency and a relatively larger gain in a frequency region less than the crossover frequency.

13. A track following control apparatus for a hard disk drive (HDD) comprising a head disk assembly (HDA) moving a magnetic head over a disk, the apparatus comprising:
   an estimator configured to receive a position error signal from the HDA and to generate estimated state information for the magnetic head in response to the position error signal, the estimator comprising a write mode estimator applying a first estimator gain constant to the position error signal to generate first estimated state information, and a read mode estimator applying a second estimator gain constant to the position error signal to generate second estimated state information, wherein the first and second estimator gain constants are different; and
   a controller configured to receive the estimated state information and to generate a control signal to control operation of the HDA,
   wherein the estimator and controller are variably configured in a write mode and a read mode.

14. The apparatus of claim 13, wherein the write mode estimator and the read mode estimator are selected between in response to a received write command initiating the write mode or a received read command initiating the read mode.

15. The apparatus of claim 14, wherein the write mode estimator and the read mode estimator are implemented in software stored in a memory associated with the HDD.

16. A track following control apparatus for a hard disk drive (HDD) comprising a head disk assembly (HDA) moving a magnetic head over a disk, the apparatus comprising:
- an estimator configured to receive a position error signal from the HDA and to generate estimated state information for the magnetic head in response to the position error signal; and
- a controller configured to receive the estimated state information and to generate a control signal to control operation of the HDA, the controller comprising a write mode controller applying a first controller gain constant to the first estimated state information to generate a control signal controlling operation of the HDA, and a read mode controller applying a second controller gain constant to the second estimated state information to generate a control signal controlling operation of the HDA,
- wherein the first and second controller gain constants are different, and
- wherein the estimator and controller are variably configured in a write mode and a read mode.

17. The apparatus of claim 16, wherein the write mode controller and the read mode controller are selected between in response to the received write command initiating the write mode or the received read command initiating the read mode.

18. The apparatus of claim 17, wherein at least one of the write mode controller and the read mode controller are implemented in software stored in a memory associated with the HDD.

19. The method of claim 1, where the head is positioned according to a reduced tolerance in the read mode as compared to the write mode.

20. A track following control apparatus for a hard disk drive (HDD) comprising a head disk assembly (HDA) for moving a magnetic head over a disk, the track following control apparatus comprising:
- an estimator configured to receive a position error signal from the HDA and to generate estimated state information for the magnetic head in response to the position error signal; and
- a controller configured to receive the estimated state information and to generate a control signal for controlling operation of the HDA;
- wherein the estimator and controller are variably configured in a write mode and a read mode, such that the magnetic head is moved in accordance with a reduced tolerance in the read mode as compared to the write mode.

* * * * *